(12) United States Patent
Gentry et al.

(10) Patent No.: US 7,959,169 B2
(45) Date of Patent: Jun. 14, 2011

(54) CHAIN DRIVEN INDEPENDENT SUSPENSION HAVING AN OSCILLATION JOINT

(75) Inventors: Michael Alan Gentry, Clinton, IL (US); Jeffrey G. Jable, Decatur, IL (US); Jason Stepp, Taylorville, IL (US); Jay S Underwood, West Lafayette, IN (US)

(73) Assignee: Caterpilar Inc., Peoria, IL (US)

( * ) Notice: Subject to any disclaimer, the term of this patent is extended or adjusted under 35 U.S.C. 154(b) by 327 days.

(21) Appl. No.: 12/078,428

(22) Filed: Mar. 31, 2008

(65) Prior Publication Data
US 2009/0242221 A1 Oct. 1, 2009

(51) Int. Cl.
*B60G 3/12* (2006.01)
(52) U.S. Cl. .............. 280/124.13; 280/6.156; 280/400
(58) Field of Classification Search ............. 280/6.156, 280/6.154, 400, 124.128, 124.13
See application file for complete search history.

(56) References Cited

U.S. PATENT DOCUMENTS

| 1,837,874 | A |   | 12/1931 | Masury |         |
|-----------|---|---|---------|--------|---------|
| 1,858,782 | A |   | 5/1932  | Masury |         |
| 1,858,784 | A | * | 5/1932  | Masury | 180/346 |
| 1,920,206 | A |   | 8/1933  | Masury |         |
| 1,936,847 | A |   | 11/1933 | Masury |         |
| 1,938,847 | A |   | 12/1933 | Mausry |         |
| 2,024,199 | A | * | 12/1935 | Barnes et al. | 180/357 |
| 2,035,416 | A | * | 3/1936  | Yunker | 280/6.154 |
| 2,079,290 | A |   | 5/1937  | Jencick |        |
| 2,091,509 | A | * | 8/1937  | Kramer | 180/344 |
| 2,298,282 | A |   | 10/1942 | Brown |         |
| 2,415,596 | A | * | 2/1947  | Larison | 180/24.09 |
| 2,792,234 | A | * | 5/1957  | Page | 280/400 |
| 2,901,051 | A | * | 8/1959  | Thibodeau | 180/41 |
| 3,175,637 | A |   | 3/1965  | Honda |         |
| 3,949,826 | A | * | 4/1976  | Shealy | 180/339 |
| 4,090,723 | A | * | 5/1978  | Hart | 280/6.156 |
| 4,560,018 | A | * | 12/1985 | Satzler | 180/9.1 |
| 4,572,311 | A | * | 2/1986  | Oswald et al. | 180/6.48 |
| 4,595,069 | A |   | 6/1986  | Oswald et al. |  |
| 4,600,069 | A | * | 7/1986  | Oswald et al. | 180/24.02 |
| 4,844,195 | A | * | 7/1989  | Deli et al. | 180/9.5 |
| 5,373,909 | A | * | 12/1994 | Dow et al. | 180/9.1 |
| 5,460,236 | A | * | 10/1995 | Lewis et al. | 180/267 |
| 5,538,274 | A | * | 7/1996  | Schmitz et al. | 280/124.142 |
| 6,460,643 | B1 | * | 10/2002 | Degelman | 180/89.12 |
| 6,550,795 | B1 | * | 4/2003  | Schlosser et al. | 280/86.75 |
| 6,679,509 | B1 |   | 1/2004  | Galazin et al. |  |
| 7,374,257 | B2 | * | 5/2008  | Oertley | 305/136 |
| 2003/0034623 | A1 | * | 2/2003 | DeWald et al. | 280/124.11 |
| 2004/0045747 | A1 | * | 3/2004 | Albright et al. | 180/9.1 |
| 2005/0176536 | A1 | * | 8/2005 | Matsumoto et al. | 474/78 |
| 2007/0135219 | A1 | * | 6/2007 | Francois | 464/111 |

* cited by examiner

*Primary Examiner* — Paul N Dickson
*Assistant Examiner* — Timothy D Wilhelm
(74) *Attorney, Agent, or Firm* — Finnegan, Henderson, Farabow, Garrett & Dunner LLP

(57) ABSTRACT

An oscillation joint for a chain driven independent suspension is disclosed. The oscillation joint may include a stationary frame member configured to support a first end of a drive chain. The oscillation joint may also include an oscillating frame member configured to support a second end of the drive chain and rotate about the stationary frame member. The oscillation joint may further include a first thrust washer located between a first surface of the stationary frame member and a substantially parallel first surface of the oscillating frame member. A first wear sleeve may be located substantially perpendicular to the first thrust washer.

16 Claims, 3 Drawing Sheets

CHAIN DRIVEN INDEPENDENT SUSPENSION HAVING AN OSCILLATION JOINT

TECHNICAL FIELD

The present disclosure relates generally to an oscillation joint, and more particularly to an oscillation joint for a chain driven independent suspension.

BACKGROUND

Machines such as, for example, wheel tractor scrapers, dozers, motor graders, wheel loaders, and other types of heavy equipment are used to perform terrain leveling tasks. These machines are often operated over uneven terrain, causing individual wheels to be placed at varying elevations. With a conventional suspension, the machine tilts when its wheels are at varying elevations, resulting in operational difficulties such as reduced traction, productivity, and operator comfort. In addition, conventionally mounted rubber tires function as undampened springs, providing an inadequate response to ground induced vibration and shock.

One method of providing an improved suspension is disclosed in U.S. Pat. No. 4,090,723 (the '723 patent) issued to Hart. The '723 patent discloses a leveling system for a construction vehicle. The construction vehicle has a pair of tandem road-wheels each rotatably mounted on an outer end of a lever arm, which has its inner end pivotally mounted on the frame of the vehicle. A double acting hydraulic cylinder is pivotally interconnected between the lever arms to selectively pivot the road-wheels to adjust the vertical height of one side of the vehicle relative to the other side of the vehicle. Each of the road-wheels is driven by a gear train connected to a driven output shaft of an engine. In one embodiment, the inner end of each lever arm is pivotally mounted at a separate pivot point on the frame of the vehicle. In another embodiment, the lever arms are pivotally mounted at a common pivot point on the frame. In both embodiments, the lever arms are pivotally mounted by annular bearing means on a spindle, inboard of the lever arm. The drive arrangement enables the road-wheel assembly to pivot with respect to the frame in response to an extension or retraction of the cylinder. The drive arrangement thus allows the suspension to function as a wheel leveling system and maintain the vehicle in a level and stable condition when opposing sides of the vehicle rest on different ground levels.

Although the leveling system of the '723 patent may provide an improved suspension, the manner in which the lever arms are mounted may result in undesirable loads on the annular bearing. In particular, because the annual bearing means are inboard of the lever arm, shock on the road-wheel may result in a stress-inducing moment at the annular bearing and spindle. This stress may result in decreased fatigue life of the annual bearing and spindle.

The present disclosure is directed to overcoming one or more of the shortcomings set forth above.

SUMMARY

In one aspect, the present disclosure is directed towards an oscillation joint. The oscillation joint may include a stationary frame member configured to support a first end of a drive chain. The oscillation joint may also include an oscillating frame member configured to support a second end of the drive chain and rotate about the stationary frame member. The oscillation joint may further include a first thrust washer located between a first surface of the stationary frame member and a substantially parallel first surface of the oscillating frame member. A first wear sleeve may be located substantially perpendicular to the first thrust washer.

In another aspect, the present disclosure is directed toward a suspension. The suspension may include a stationary frame configured to rotatably support a first drive sprocket. The suspension may also include a movable frame rotatable about the stationary frame. The suspension may further include a hydraulic cylinder mounted to the movable frame and configured to dampen a rotation of the movable frame relative to the stationary frame. The suspension may additionally include a second drive sprocket rotatably supported by the movable frame and operatively connected to a traction device. A chain may drivingly connect the first and second sprockets.

DETAILED DESCRIPTION

Figure 1:
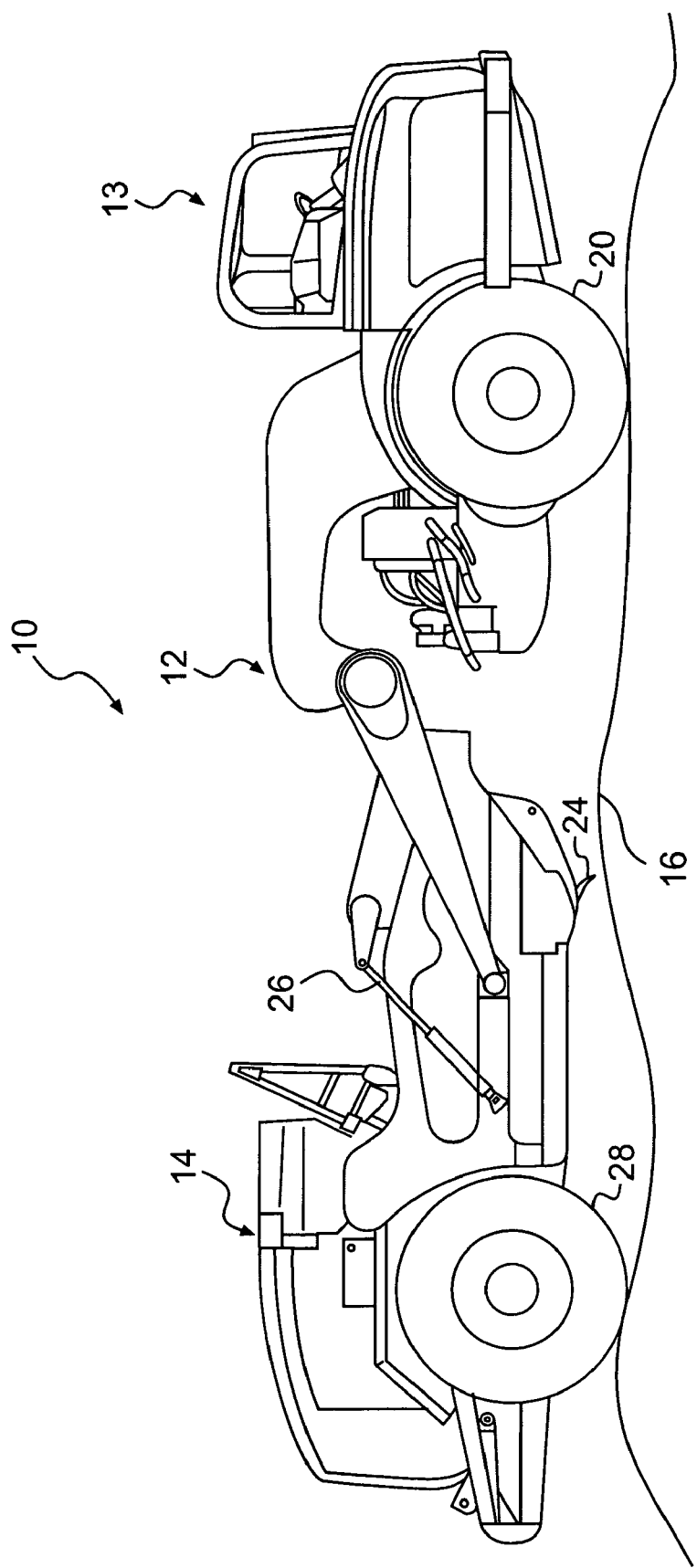
FIG. 1 is a diagrammatic illustration of an exemplary machine.

FIG. 1 illustrates a worksite 10 with an exemplary machine 12, such as a wheel tractor scraper, performing a predetermined task. Worksite 10 may include, for example, a mine site, a landfill, a quarry, a construction site, or any other type of worksite. The predetermined task may be associated with altering the current geography at worksite 10 and may include, for example, a grading operation, a scraping operation, a leveling operation, a bulk material removal operation, or any other type of geography altering operation at worksite 10.

The machine 12 may include a tractor 13 operatively connected to a bowl 14 and configured to pull the bowl 14 across a surface 16 of material. The tractor 13 may be supported relative to the surface 16 via one or more traction devices 20 (only one of which is illustrated). The bowl 14 may be configured to dislodge or disrupt material from the surface 16, load the material, and contain or store the material. For example, the bowl 14 may include an implement 24 and an actuator 26 supported relative to the surface 16 via one or more traction devices 28 (only one of which is illustrated). It is contemplated that the machine 12 may include any number of bowls 14 operatively connected to one another and/or to the tractor 13, as is known in the art. It is further contemplated that the bowl 14 may additionally include an elevator or other conveyor configured to assist in loading the bowl 14, as is known in the art.

Figure 2:
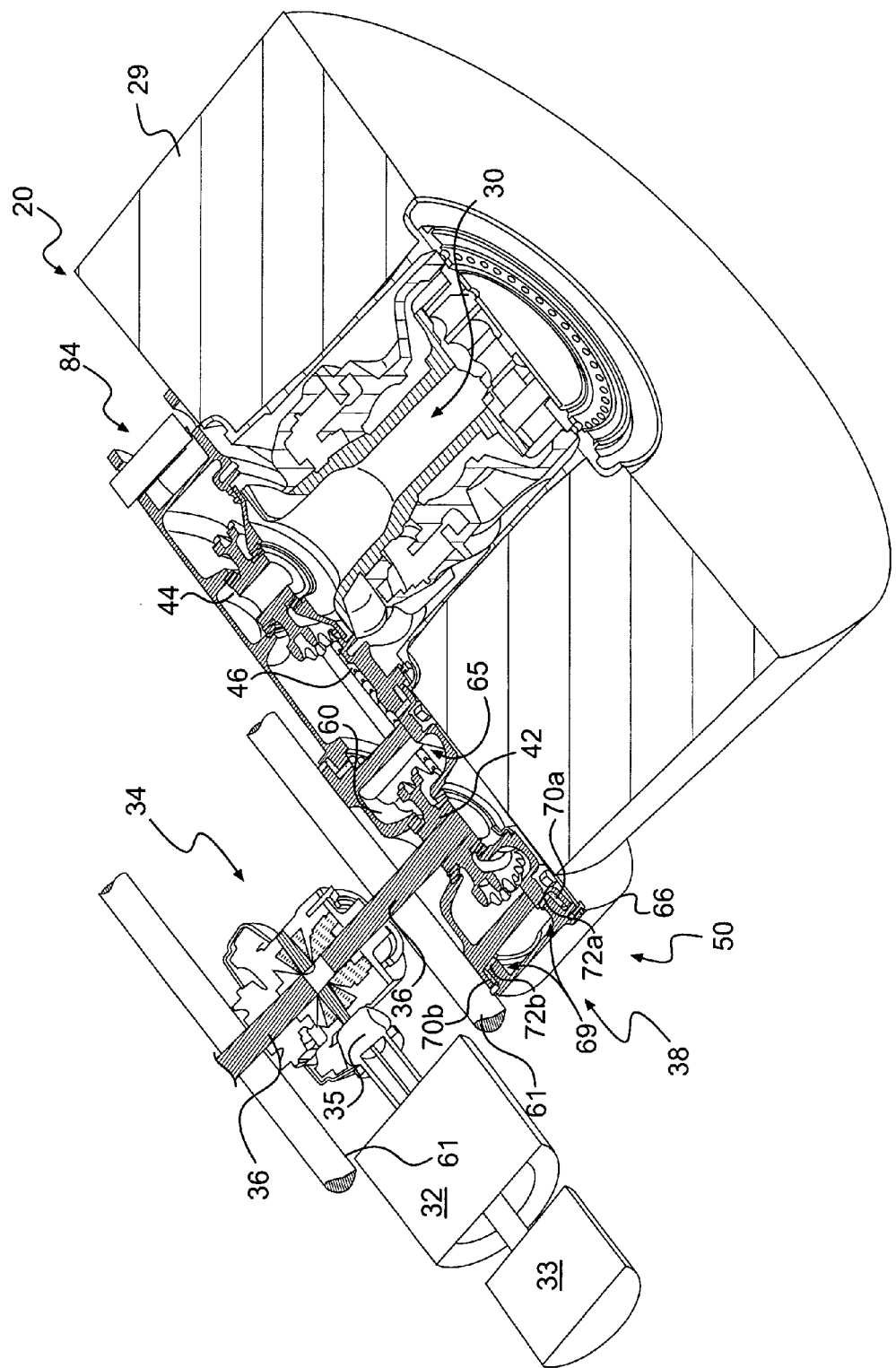
FIG. 2 is a cross-sectional top view of a drive assembly that may be used with the machine of FIG. 1.

Referring to FIG. 2 the traction device 20 may include a tire 29 configured to affect the propulsion and yaw of the tractor 13 with respect to the surface 16. The traction devices 20 may include a guide wheel or a hub 30, and/or additional components known in the art. Movement of the traction devices 20 may propel the tractor 13 to pull the bowl 14 across surface 16 (referring to FIG. 1).

In order to transmit power to the traction devices 20, the machine may include a transmission 32 configured to transmit power from a power source 33 to a differential 34 via a pinion 35. The differential 34 may transfer power through opposing axle shaft 36 to leading arms 38 (one of two shown in FIG. 2). In order to provide an independent suspension, the leading arm 38 may house a first drive sprocket 42 operatively connected to the axle shaft 36, and a wheel bearing second drive sprocket 44 operatively connected to the traction device 20. A drive chain 46 may drivingly connect the sprockets 42, 44. Upon rotation of the axle shaft 36 under action of the transmission 32, the drive chain 46 may transfer power from the first drive sprocket 42 to the second sprocket 44 to effect translational motion of the traction devices 20.

A first end 50 of the leading arm 38 may include a stationary inner frame 60, fixably mounted to a frame member 61 of tractor 13 (referring to FIG. 1) and configured to rotatably support the first drive sprocket 42. The inner frame 60 may include one or more slotted openings 65 (one of two shown in cross-sectional FIG. 2) through which the drive chain 46 may pass. Specifically, the slotted openings 65 may be configured so that the drive chain may translate in a vertical direction without interference from the inner frame 60. A movable outer frame 66 may be configured to rotatably support the second drive sprocket 44 and rotate relative to the stationary inner frame 60 about an axis of rotation collinear with the axle shaft 36.

A load bearing oscillation joint 69 may support the outer frame 66 and facilitate rotation of the outer frame 66 about the inner frame 60. The oscillation joint 69 may include thrust washers 70a, 70b and wear sleeves 72a, 72b positioned between sliding surfaces of the inner frame 60 and the outer frame 66. Specifically, the thrust washers 70a, 70b may be positioned so that they are substantially parallel to each other and perpendicular to axle 36. A first surface of each thrust washer 70a, 70b may be in substantially planar contact with a planar face of the inner frame 60. A second surface of each thrust washer 70a, 70b may be in substantially planar contact with a planar face of the outer frame 66. The wear sleeves 72a, 72b may be positioned so that they are substantially coaxial. A first surface of each wear sleeve 72a, 72b may be in contact with a cylindrical face of the inner frame 60. A second surface of each wear sleeve 72a, 72b may be in contact with annular surface of the outer frame 66. As shown in FIG. 2, the thrust washers 70a, 70b and wear sleeves 72a, 72b may be positioned substantially symmetrically relative to the first drive sprocket 42. For example, one thrust washer 70a and one wear sleeve 72a may be positioned outboard of first drive sprocket 42 and one thrust washer 70b and one wear sleeve 72b may be positioned inboard of drive sprocket 42. The thrust washers 70a, 70b and wear sleeves 72a, 72b may be made of a relatively thin, durable, woven material. For example, the thrust washer and wear sleeve may be about 0.25 inches and 0.125 inches thick, respectively and made of a phenolic woven material. The width of the wear sleeve may be about 2.75 inches. The width of the thrust washer, i.e., the difference between the outer diameter and the inner diameter may be about 3 inches. It is further contemplated that the circular thrust washers 70a, 70b may be formed by two or more arc segment members.

Figure 3:
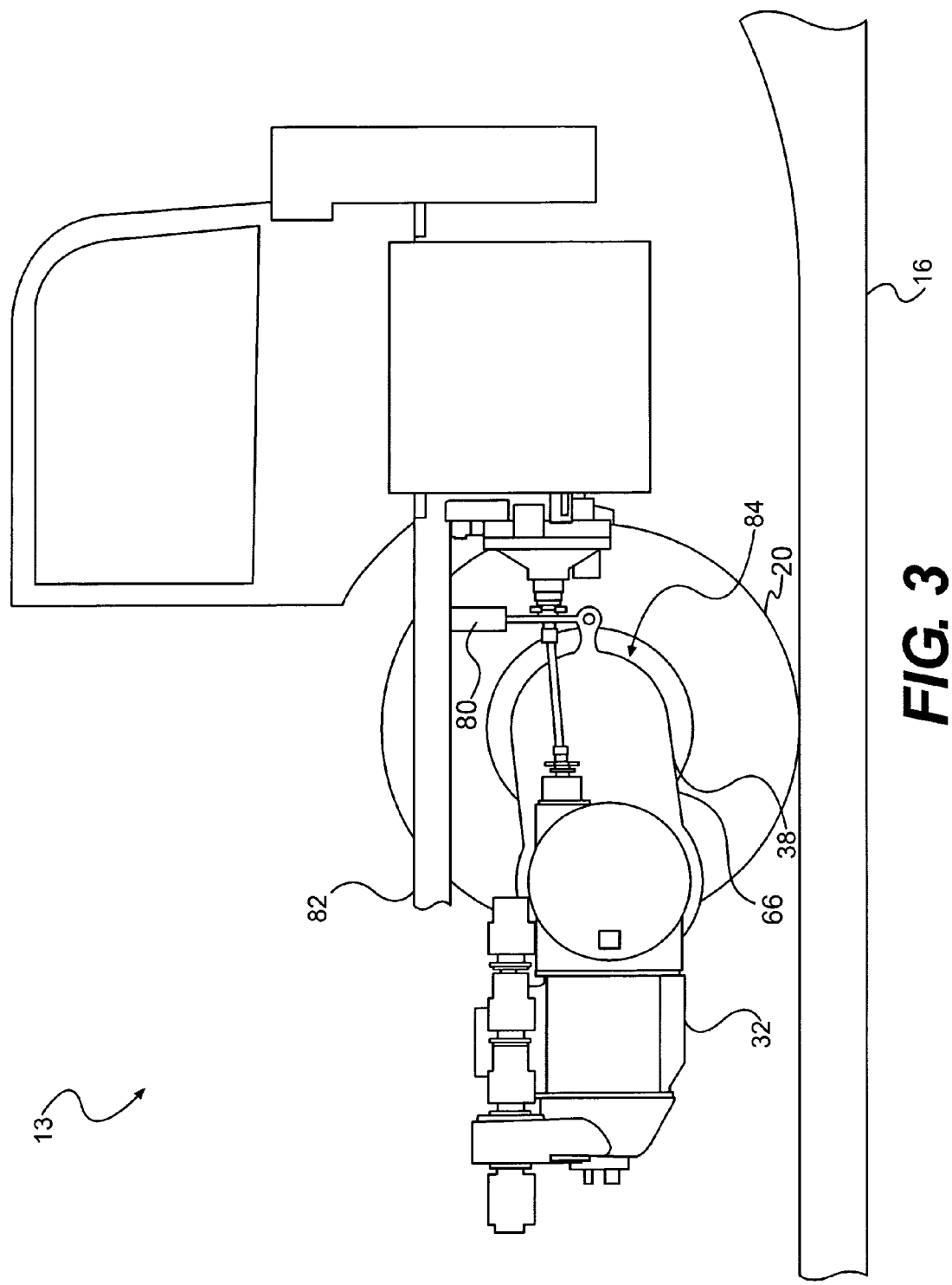
FIG. 3 is a cross-sectional side view of a tractor that may be used with the machine of FIG. 1.

As shown in FIG. 3, a hydraulic suspension cylinder 80 may be connected between a frame member 82 of tractor 13 and a second end 84 of the leading arm 38. The suspension cylinder 80 may help dampen shock loading transferred from the traction device 20 to the tractor 13. Thus, the suspension cylinder 80 may help dampen rotation of the outer frame member 66 about the inner frame member 60 (referring to FIG. 2).

Industrial Applicability

The disclosed suspension, although particularly useful with wheel tractor scrapers, may be applicable to any earthmoving machine. The disclosed oscillation joint may allow an oscillation joint and two sprockets to be mounted in substantially the same plane. The disclosed suspension may thus result in a reduced moment transmitted to the oscillation joint. The reduced moment may result in increased fatigue life of the oscillation joint. Operation of the suspension will now be explained.

Referring to FIG. 1, the machine 12 may be operated to traverse the uneven surface 16 to dislodge or disrupt material therefrom, load material into the bowl 14, and transport loaded material to another location for unloading. As such, the surface 16 may be manipulated to achieve a desired grade and/or material may be moved from surface 16 to achieve a desired grade at the unloading location.

Referring to FIG. 2, the leading arm 38 may be adapted such that vertical movement of the wheels in response to changes in the uneven surface 16 maybe translated into a rotation of the movable outer frame member 66 with respect to the stationary inner frame member 60. Specifically, as the traction device assembly 20 moves upward in response to a change in the surface 16, second end 84 and the second drive sprocket 44 may rotate about an axis collinear with the axle 36 while the first drive sprocket 42 may remain substantially stationary. The suspension cylinder 80 (referring to FIG. 3) at the second end 84 of the leading arm 38 may be compressed by this motion and may thereby absorb vibration caused by the roughened terrain. As the traction device 20 moves downward in response to a further change in the surface 16, the second end 84 of the leading arm 38 and the second drive sprocket 44 may rotate, while the first drive sprocket 42 may remain substantially stationary. The suspension cylinder 80 (referring to FIG. 3) at the second end 84 of the leading arm 38 may extend during this motion and may thereby dampen the vibration caused by the roughened terrain. The drive chain 46 may pivot with the leading arm 38, and may translate through slotted openings 65.

As the outer frame 66 rotates about the inner frame 60, the sliding surfaces of the outer frame member 66 may rotate relative to the thrust washers 70a, 70b and wear sleeves 72a, 72b. It is further contemplated that the thrust washers 70a, 70b and wear sleeves 72a, 72b may rotate relative to inner frame member 60. Because these sliding surfaces may be substantially symmetric about the plane of the first and second drive sprockets 42, 44 the moment arm through which shock loads are transmitted from the traction device 20 through the second end 84 of the leading arm 38 to the first end 50 of the leading arm 38 may be substantially zero.

The disclosed suspension may be an inexpensive, effective solution for allowing an oscillation joint and two sprockets to be mounted in substantially the same plane, thus reducing the moment transmitted from the wheel-bearing sprocket to the oscillation joint. The reduced moment may result in increased fatigue life of the oscillation joint.

It will be apparent to those skilled in the art that various modifications and variations can be made to the disclosed suspension. Other embodiments will be apparent to those skilled in the art from consideration of the specification and practice of the disclosed suspension. It is intended that the specification and examples be considered as exemplary only, with a true scope being indicated by the following claims and their equivalents.

What is claimed is:

1. An oscillation joint, comprising:
   a stationary frame member configured to rotatable support a first drive sprocket;
   an oscillating frame member configured to support a second drive sprocket and rotate about the stationary frame member, the first and second drive sprockets being aligned along a plane;

a drive chain extending about the first and second drive sprockets;

a first thrust washer located between a first surface of the stationary frame member and a substantially parallel first surface of the oscillating frame member;

a second thrust washer located between a second surface of the stationary frame member and a substantially parallel second surface of the oscillating frame member, the second thrust washer disposed substantially parallel to the first thrust washer, wherein the first and second thrust washers are located substantially symmetrical with respect to the plane;

a first wear sleeve, wherein the first wear sleeve is substantially perpendicular to the first thrust washer; and a second wear sleeve disposed substantially perpendicular to the second thrust washer and substantially parallel to the first wear sleeve, wherein the first and second wear sleeves are located substantially symmetrical with respect to the plane.

2. The oscillation joint of claim 1, wherein the first and second thrust washers and the first and second wear sleeves are rotatable relative to the stationary frame member.

3. The oscillation joint of claim 1, wherein the first and second thrust washers and the first and second wear sleeves are rotatable relative to the oscillating frame member.

4. The oscillation joint of claim 1, wherein the stationary frame member further includes a slotted channel through which the drive chain may translate.

5. The oscillation joint of claim 1, wherein at least one of the first and second thrust washers and the first and second wear sleeves is composed of a phenolic material.

6. The oscillation joint of claim 1, wherein each of the first and second thrust washers is about 0.25 inches thick and a difference between an inner diameter and an outer diameter of each of the first and second thrust washers is about three inches.

7. The oscillation joint of claim 1, wherein each of the first and second wear sleeve sleeves is about 0.125 inches thick.

8. The oscillation joint of claim 1, wherein each of the first and second wear sleeve sleeves is about 2.75 inches wide.

9. A suspension comprising:

a stationary frame configured to rotatably support a first drive sprocket;

a movable frame supported substantially symmetrically with respect to the first drive sprocket and rotatable about the stationary frame;

a hydraulic cylinder mounted to the movable frame and configured to dampen a rotation of the movable frame relative to the stationary frame;

a second drive sprocket rotatably supported by the movable frame and operatively coupled to a fraction device, the first and second drive sprockets being aligned along a plane;

a chain drivingly connected to the first and second drive sprockets;

a first thrust washer located between a first surface of the stationary frame and a substantially parallel first surface of the movable frame;

a second thrust washer located between a second surface of the stationary frame and a substantially parallel second surface of the movable frame, the second thrust washer disposed substantially parallel to the first thrust washer, wherein the first and second thrust washers are located substantially symmetrical with respect to the plane;

a first wear sleeve, wherein the first wear sleeve is substantially perpendicular to the first thrust washer; and a second wear sleeve disposed substantially perpendicular to the second thrust washer and substantially parallel to the first wear sleeve, wherein the first and second wear sleeves are located substantially symmetrical with respect to the plane.

10. The suspension of claim 9 wherein the movable frame is configured to rotate about the stationary frame in response to a substantially vertical motion of the traction device.

11. The suspension of claim 9, wherein the hydraulic cylinder is configured to dampen a substantially vertical motion of the traction device.

12. The suspension of claim 9, wherein the stationary frame includes a slotted channel through which the chain may pass.

13. A wheel tractor scraper comprising:

a power source;

a transmission configured to receive power from the power source;

a differential connected to the transmission and configured to receive power from the transmission and direct power to an axle shaft;

a first frame;

a first sprocket rotatably supported by the first frame and operatively connected to the axle shaft;

a second frame rotatable about the first frame;

an oscillation joint of the first frame and the second frame being substantially symmetric with respect to the first sprocket;

a second sprocket rotatably supported by the second frame and operatively connected to a traction device, the first and second sprockets being aligned along a plane;

a chain drivingly connected to the first and second sprockets;

a first thrust washer located between a first surface of the first frame and a substantially parallel first surface of the second frame;

a second thrust washer located between a second surface of the first frame and a substantially parallel second surface of the second frame, the second thrust washer disposed substantially parallel to the first thrust washer, wherein the first and second thrust washers are located substantially symmetrical with respect to the plane;

a first wear sleeve, wherein the first wear sleeve is substantially perpendicular to the first thrust washer;

a second wear sleeve disposed substantially perpendicular to the second thrust washer and substantially parallel to the first wear sleeve, wherein the first and second wear sleeves are located substantially symmetrical with respect to the plane; and a hydraulic cylinder operatively connected to the second frame and a third frame and configured to dampen a substantially vertical motion of the traction device.

14. The wheel tractor scraper of claim 13, wherein the second frame is configured to rotate about the first frame in response to a substantially vertical motion of the traction device.

15. The wheel tractor scraper of claim 13, wherein the hydraulic cylinder is configured to dampen a rotation of the second frame with respect to the first frame.

16. The wheel tractor scraper of claim 13, wherein the first frame includes a slotted channel and the chain is configured to translate through the slotted channel in response to a rotation of the second frame.

* * * * *